United States Patent [19]
Canning et al.

[11] Patent Number: 5,415,730
[45] Date of Patent: May 16, 1995

[54] METAL COATED OPTICAL FIBER TECHNIQUES

[75] Inventors: Everett J. Canning, Trenton; Ranjan Dutta, Lawrenceville, both of N.J.

[73] Assignee: AT&T Corp., Murray Hill, N.J.

[21] Appl. No.: 167,259

[22] Filed: Dec. 14, 1993

[51] Int. Cl.⁶ .................................. H01L 21/302
[52] U.S. Cl. ............................ 216/17; 65/406; 385/49; 385/92; 216/79; 216/99
[58] Field of Search ............ 156/647, 662; 65/60.4, 65/406, 431; 385/14, 49, 88, 89, 92

[56] References Cited

U.S. PATENT DOCUMENTS

| | | | |
|---|---|---|---|
| 4,348,587 | 9/1982 | Tangonan et al. | 250/227.14 |
| 4,418,984 | 12/1983 | Wysocki et al. | 385/127 |
| 4,606,608 | 8/1986 | Wysocki | 385/128 |
| 4,750,799 | 6/1988 | Kawachi et al. | 385/49 |
| 4,904,036 | 2/1990 | Blonder | 385/49 |
| 5,017,263 | 7/1991 | Clark | 156/633 |
| 5,119,451 | 6/1992 | Wills et al. | 385/49 |
| 5,124,281 | 6/1992 | Ackerman et al. | 437/209 |
| 5,178,319 | 1/1993 | Coucoulas | 228/234 |
| 5,178,723 | 1/1993 | Nguyen | 156/633 |
| 5,194,105 | 3/1993 | Nguyen | 156/293 |
| 5,291,572 | 3/1994 | Blonder et al. | 385/88 |

OTHER PUBLICATIONS

"Metal Coated Fibers," K. Inada et al., SPIE, Optical Fiber Characteristics and Standards, vol. 584, 1985, pp. 99–106.

*Primary Examiner*—George Fourson
*Assistant Examiner*—Thomas G. Bilodeau
*Attorney, Agent, or Firm*—Roderick B. Anderson

[57] ABSTRACT

Aluminized optical fiber is used for transmitting electricity, as well as transmitting lightwaves. In one example, an aluminized optical fiber (17) is bonded within a photonics package in contact with a conductor (15) that interconnects it to a photonic device (12) or electronic circuit. Power is then supplied to the package by applying it to the aluminized coating (19) of the optical fiber. This avoids the need for a separate conductor extending into the photonics package for supplying electrical power. It also may significantly simplify system design since the power supply can conveniently be included a fairly remote distance from the photonics package.

The aluminized optical fiber can be bonded to a metallization in the V-groove (13) that provides electrical contact simply by applying heat and pressure. This allows the aluminized fiber to be bonded without the need for any adhesives, while assuring good electrical contact for the transmission of electrical power. According to another embodiment (FIG. 6), the aluminized coating is used for electrical communication in an optical fiber television system.

8 Claims, 2 Drawing Sheets

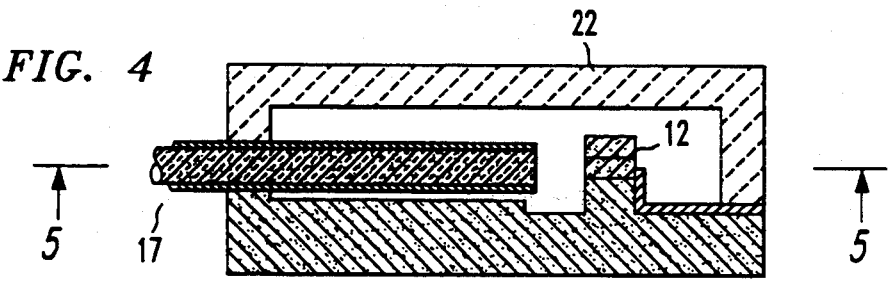
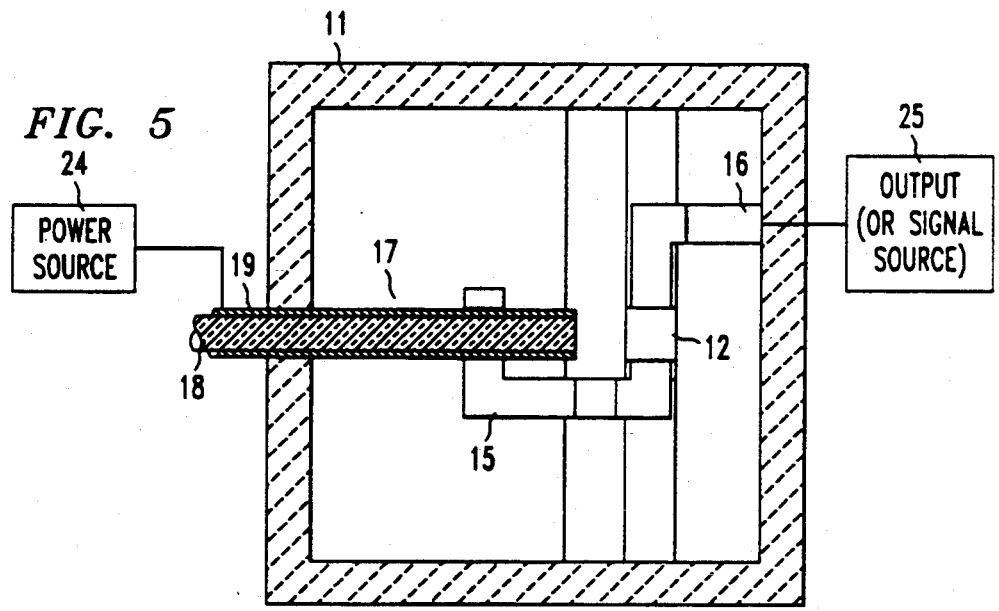
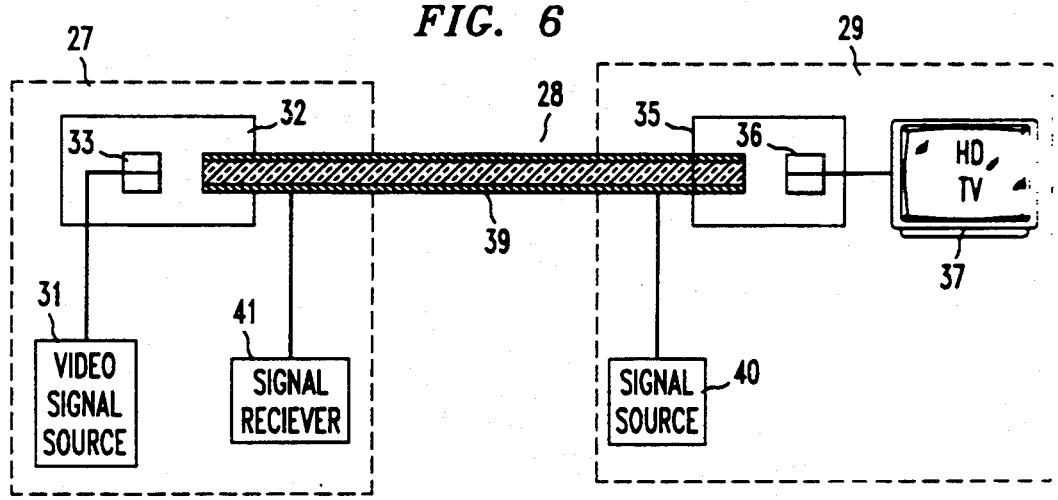

METAL COATED OPTICAL FIBER TECHNIQUES

TECHNICAL FIELD

This invention relates to techniques for transmitting electricity to electronic circuitry and, more particularly, to techniques for supplying electricity to electronic circuits that are used in conjunction with optical fibers.

BACKGROUND OF THE INVENTION

The union of lightwave technology and electronics technology, a science sometimes known as "photonics" or "optoelectronics", has been the subject of intensive research and development in recent years. Modern communications systems typically use complex electronics circuitry to operate on information in the form of electricity, lasers for converting the information to lightwaves, optical fibers for transmitting the lightwaves, photodetectors for converting the lightwave signals back to electronic signals, and other circuitry for operating on the electrical output of the photodetector.

Photonics device packages typically enclose one end of an optical fiber and a photonics device, e.g., a laser or a photodetector, to seal and protect the photonics device and the end of the optical fiber into which light is directed or from which light is extracted. As described in the United States patent of H. R. Clark, U.S. Pat. No. 5,017,263, granted May 21, 1991, and the United States patent of Ackerman et al., U.S. Pat. No. 5,124,281, granted June 23, 1992, both hereby incorporated herein by reference, an optical fiber can be mounted in precise alignment with the photonics device by supporting it in a V-groove photolithographically formed in a monocrystalline substrate. Whether the photonics package is a laser package or a photodetector package, the photonics device itself must be electrically powered, and electronic circuitry associated with the device similarly requires electrical power, which is typically supplied by a power source and appropriate electrical conductors extending into the photonics package.

It has recently been found that aluminized optical fibers, that is, fibers covered on their outer surfaces by a thin layer of aluminum, are advantageous for use in photonics device packages because the aluminum coating protects the fiber from accidental breakage. Aluminized optical fiber can be held within a V-groove by epoxy, but it is recognized that the use of such adhesives may constitute a source of contamination within the photonics package. Because photonics packages are used in such large numbers, there is a long-felt need for techniques that would simplify their fabrication and operation; it would also be desirable to avoid the use of adhesives in such packages.

SUMMARY OF THE INVENTION

We have found that aluminized optical fiber can be used for transmitting electricity, as well as transmitting lightwaves. Thus, for example, an aluminized optical fiber is bonded within a photonics package in contact with a conductor that interconnects it to the photonics device or to other electronic circuitry. Power is then supplied to the package by connecting the aluminized coating of the optical fiber to a power source. This avoids the need for a separate conductor extending into the photonics package for supplying electrical power, and it also may significantly simplify system design, since the power supply can conveniently be included at a fairly remote distance from the photonics package. As described below, the aluminized coating can be used for transmitting electrical signals as well as electrical power.

The aluminized optical fiber can be bonded to a metallization in an alignment V-groove simply by applying heat to the metallization and pressing it against the optical fiber. This allows the aluminized fiber to be bonded without the need for any adhesives, and the metallization can interconnect the optical fiber coating with the photonics device. Thus, according to one embodiment of the invention, one thermo-compression bonding step can provide precision alignment, structural bonding without adhesives, and electrical interconnection. According to another embodiment, the aluminized coating is used for electrical communication in an optical fiber television system.

These and other objects, features and advantages of the invention will be better understood from a consideration of the following detailed description taken in conjunction with the accompanying drawing.

BRIEF DESCRIPTION OF THE DRAWING

FIG. 4 is a schematic sectional side view of a photonics package of FIG. 1 at a subsequent stage of fabrication;

FIG. 5 is a view taken along lines 5—5 of FIG. 4; and

FIG. 6 is a schematic view of a television transmission system in accordance with another embodiment of the invention.

DETAILED DESCRIPTION

Figure 1:
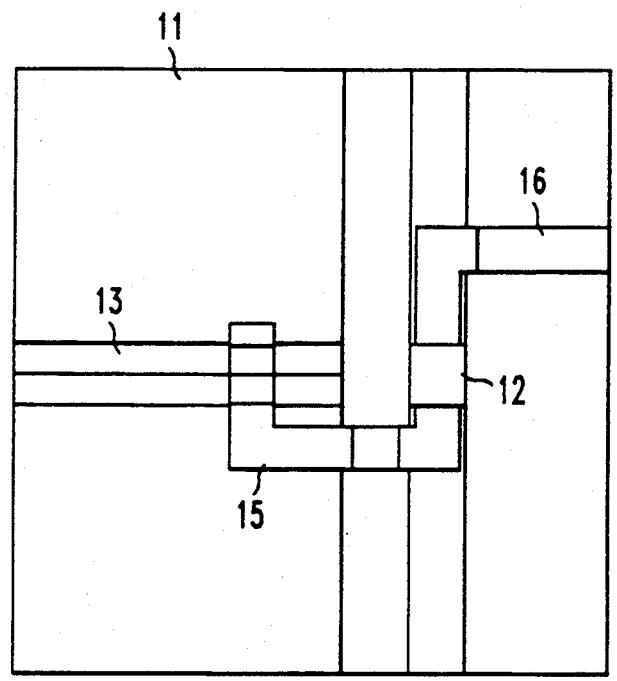
FIG. 1 is a top view of part of a photonics package in accordance with an illustrative embodiment of the invention.

The drawings are intended to be schematic; some of the dimensions have been intentionally distorted to aid in clarity of exposition. Referring now to FIG. 1, there is shown a portion of a photonics package comprising a monocrystalline silicon substrate 11 upon which is mounted a photonic device 12. A V-groove 13 is formed in the substrate for the purpose of supporting an optical fiber. As is known in the art, V-groove 13 can be made with a great deal of precision by photolithographic masking and etching. Such etching of an appropriately oriented monocrystalline substrate is anisotropic and can be made to be very precise because the etching is constrained along inherent crystallographic planes of the substrate. A metallization 15 interconnects V-groove 13 with photonic device 12, and another metallization 16 connects the photonic device 12 with the edge of the substrate 11. If the photonics package is intended to be used as an optical detector, photonic device 12 may be a photodetector, whereas if it is to be used as a lightwave source, photonic device 12 may be a laser or a light-emitting diode.

Figure 2:
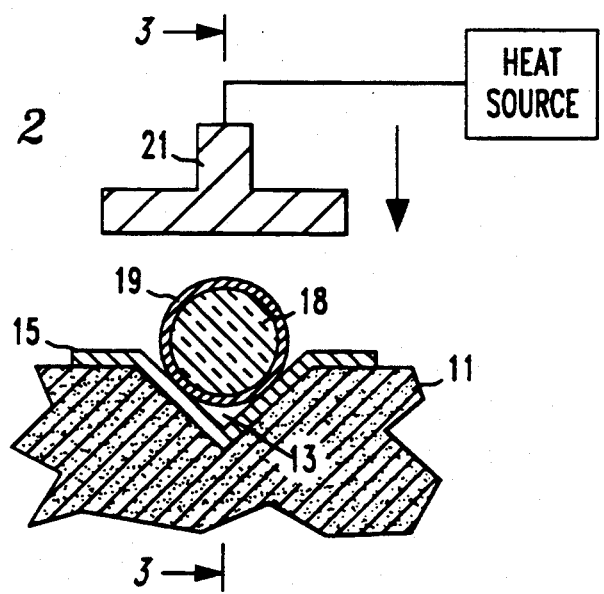
FIG. 2 is a schematic view of apparatus for bonding an aluminized optical fiber in the photonics package of FIG. 1.
Figure 3:
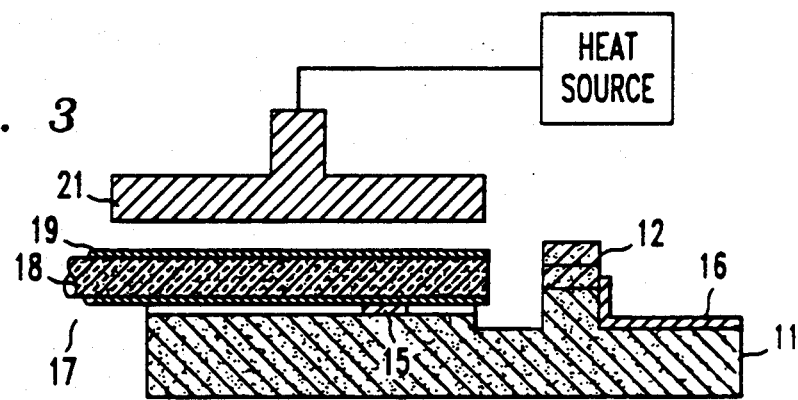
FIG. 3 is a view taken along lines 3—3 of FIG. 2.

Referring to FIGS. 2 and 3, an aluminized optical fiber 17 is positioned in V-groove 13 preparatory to bonding. As described, for example, in the paper, "Metal Coated Fibers", K. Inada et al., SPIE Vol. 584, *Optical Fiber Characteristics and Standards* (1985), hereby incorporated herein by reference, an optical fiber can be made to be much more robust and less susceptible to cracking or breaking by coating it with a thin coating of aluminum. Thus, the aluminized optical fiber 17 comprises a glass portion 18 having a diameter, for example, of one hundred twenty-five micrometers, coated with an aluminum coating or layer 19 having a thickness of, for example, twenty-tour micrometers and an outer diameter of one hundred seventy-three micrometers.

The optical fiber 17 is bonded to the metallization 15 by applying heat and pressure with a bonding tool 21 shown in FIGS. 2 and 3. As is described more fully in the copending application of Coucoulas et al., Ser. No. 08/167,255, filed Dec. 14, 1993, incorporated herein by reference, adhesives for bonding an aluminized optical fiber to an aluminum metallization can be avoided by applying appropriate pressure and heat for several seconds. The geometry of the optical fiber and the metallization causes a rupture of aluminum oxide coatings, permitting the aluminum of the optical fiber to fuse with the aluminum of the metallization. The bonding tool 21 is preferably longer in the axial direction than the axial length of metallization 15, as shown in FIG. 3, which results in a further concentration of forces applied by the bonding tool 21 on the interface of optical fiber and metallization 15. The geometry of the apparatus inherently concentrates applied forces to straight-line contacts of the aluminum coating 19 with the metallization 15 to produce a relatively high pressure at the interface without applying a sufficiently high force to damage the glass optical fiber portion 18. For example, a force of four-tenths of a gram per micron of length may be applied at a temperature of four hundred degrees Celsius for a time of five to fifteen seconds. After bonding, the central axis of the optical fiber 17 is aligned with an active region of photonic device 12. The active region may, for example, be the light-emitting junction of a semiconductor diode laser.

Referring to FIG. 4, the assembly of the photonics package is completed by using a cover member 22 to enclose the photonics device 12 and the end of the optical fiber 17 facing the photonics device. The cover member 22 may be sealed to substrate 11 by any of various methods known in the an to provide hermeticity within the package. The cover member 22 may be made of silicon, ceramic or any of various other materials; its configuration is schematic and intended only to illustrate its function. In practice, it may be desired to use a silicon cover member having a V-groove for containing the optical fiber 17 in the same manner as the substrate. 11 Hermetic sealing may or may not be required depending upon the use to which the package is to be put.

Referring to FIG. 5, in accordance with the invention, a power source 24 is connected to the aluminum coating 19 for the purpose of providing electrical power to the optoelectronic device via the coating 19 and metallization 15. The photonics package also typically contains other electronic circuitry which, for simplification, has not been shown. It is to be understood that such circuitry can be powered by electricity provided to the aluminum coating 19 as shown. The metallization 16 is connected to an external circuit device 25 which may be an output, if photonic device 12 is a photodetector, or a signal source if the device 12 is a laser or light-emitting diode.

If the photonics package of FIG. 5 is a receiver, lightwaves are transmitted from left to right by the glass portion 18 of optical fiber 17, detected by device 12 which is a photodetector, the photodetector and associated circuitry extracting the signal portions from the lightwave and transmitting them as electricity to the external device 25 which is an output. If the package is a source, the external circuitry 25 is a signal source which modulates light emitted by device 12, a laser or other light-emitting device, the light being directed into the glass portion 18 of optical fiber 17 and transmitted from right to left. Again, the power for generating the light is supplied by power source 24, as described before.

It can be appreciated that by using aluminum coating 19 as a conductor, as well as a structural support for the optical fiber, one avoids the need for providing an additional lead or conductor into the photonics package for providing electrical power. Another advantage is that, since all or most of optical fiber 17 is aluminized in any event, the power source 24 can be provided at a remote location from the photonics package. In this way, for example, one power source 24 may be used for supplying power to a number of photonics packages, thus providing further cost advantages. As with any electrical conductor, the aluminum coating 19 may be insulated in any of various known manners to prevent short circuits of the electricity carried by it. For example, the entire length of the optical fiber may be covered with an electrically insulating coating.

FIG. 6 is a schematic view of an optical fiber television system, in accordance with another embodiment of the invention, comprising a head end 27 which transmits video signals by way of an aluminized optical fiber 28 to a subscriber end 29. The head end comprises a video signal source 31 connected to a photonics package 32 which modulates light from a laser 33 to transmit video signals by way of lightwaves on optical fiber 28. Subscriber end 29 includes a photonics package 35 comprising a photodetector 36 which detects the lightwaves on optical fiber 28, converts the video signals to electrical signals, and transmits them to a high definition television set (HDTV) 37.

One problem with television systems of the type presently known as cable television (CATV) systems is the difficulty the subscriber has in communicating to the head end. Presently, such communication is by commercial telephone. Communication by the optical fiber that transmits the video signal is often impractical because it is desired that such optical fibers be used only for one-way transmission. One solution is to provide two optical fibers between the head end and each subscriber, but this significantly increases costs.

In accordance with the invention, the subscriber communicates with the head end electrically, making use of the aluminum coating 39 on the optical fiber 28. Thus, an appropriate signal source 40 at the subscriber end is connected to the aluminum coating 30 on the optical fiber so that information can be transmitted from the subscriber end to the head end, where it is received and demodulated by a signal receiver 41. Signal source 40 may, for example, be a telephone transmitter and receiver 27 may be a telephone receiver by which the subscriber may request the transmission of specific TV programs or movies, for example. One can see that by this method, two-way transmission is provided to the subscriber, while supplying the subscriber with only a single aluminized optical fiber. The television receiver 37 is designated a high definition TV receiver only for the purpose of emphasizing that the optical fiber 28 is capable of carrying video signals over an extremely wide bandwidth which allows many channels of HDTV.

New forms of interactive media service are allowed by the system of FIG. 6 since the subscriber may communicate with the head end concurrently with receiving video signals and other signals on the aluminized optical fiber 28. The system shown in FIG. 6 is of course highly simplified, and any working system would require a great deal of electronic circuitry in addition to that shown. It nevertheless demonstrates the practicality of using the aluminum coating to permit electronic communication in accordance with the invention. The aluminum coating is typically an annulus having an inner diameter of one hundred twenty-five micrometers and an outer diameter of one hundred seventy-three micrometers. It can be shown that aluminum is a very good conductor of electricity and that an annulus is a good geometrical form for the conduction of high frequency electrical energy because of a property of high frequency transmission known as "skin effect". Thus, the aluminized coating inherently satisfies many of the electrical requirements for the electrical communication shown in FIG. 6.

The various embodiments shown are intended to be merely illustrative of applicants' invention. For example, many other circuits can be devised, without exercising inventive ingenuity, using the aluminum coating of an aluminized optical fiber to transmit either electrical power or electronic signals. Other embodiments and modifications may be made by those skilled in the art without departing from the spirit and scope of the invention.

We claim:

1. A method for making a photonics device package comprising an optical fiber and a photonic device comprising the steps of:

forming a V-groove in a monocrystalline substrate;
   mounting a photonic device near one end of the V-groove;
   metallizing a part of the V-groove with a first metallization and electrically interconnecting the first metallization with the photonic device;
   metallizing a length of optical fiber by applying a metal coating to an optical fiber;
   and bonding the metallized optical fiber within the V-groove such that it electrically contacts the first metallization.

2. The method of claim 1 wherein:
   said bonding step comprises the step of applying force to the optical fiber to force it against the first metallization while applying heat to the interface of the optical fiber and the first metallization.

3. The method of claim 2 further comprising the step of:
   applying the force to a greater length of the optical fiber than that which contacts the first metallization so as to concentrate the force at the interface of the fiber with the first metallization.

4. The method of claim 2 wherein:
   the metal with which the fiber is coated is aluminum; and the first metallization is aluminum.

5. The method of claim 1 further comprising the step of:
   providing power to the photonic device comprising the step of applying electrical power to the metal coating of the optical fiber, whereby the power is transmitted to the photonic device via said first metallization.

6. The method of claim 5 further comprising the step of:
   prior to the bonding step, providing on the substrate a second metallization connected to the photonic device;
   enclosing the free end of the metallized optical fiber nearest the photonic device and the photonic device within a cover member that contacts the substrate and protects the photonic device from outside contaminants;
   and electrically contacting the second metallization with electronic circuitry that is outside said cover member.

7. The method of claim 6 wherein:
   the photonic device is a light-emitting device;
   the light-emitting device is positioned to emit light into said metallized optical fiber;
   and the electronic circuitry is a signal source.

8. The method of claim 6 wherein:
   the photonic device is a photodetector;
   the photodetector is positioned to receive light from the metallized optical fiber;
   and the electronic circuitry is a load.

* * * * *